(12) United States Patent
Tan et al.

(10) Patent No.: US 10,324,682 B2
(45) Date of Patent: Jun. 18, 2019

(54) METHOD, APPARATUS, AND STORAGE MEDIUM FOR CONTROLLING AUDIO PLAYING BASED ON PLAYING ENVIRONMENT

(71) Applicant: Xiaomi Inc., Beijing (CN)

(72) Inventors: Kangxi Tan, Beijing (CN); Yongjian Sun, Beijing (CN); Xin Liang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/272,685

(22) Filed: Sep. 22, 2016

(65) Prior Publication Data

US 2017/0090863 A1    Mar. 30, 2017

(30) Foreign Application Priority Data

Sep. 25, 2015 (CN) .......................... 2015 1 0622863

(51) Int. Cl.
*G06F 3/16* (2006.01)
*H04W 4/80* (2018.01)
(Continued)

(52) U.S. Cl.
CPC ............ *G06F 3/165* (2013.01); *G11B 27/102* (2013.01); *G11B 27/28* (2013.01); *H04W 4/80* (2018.02)

(58) Field of Classification Search
CPC ................ G05B 19/0425; G06F 3/165; G06F 17/30017; G06K 9/00744; G06K 9/52; G06T 7/20; G06T 7/60; G09G 3/001; G11B 27/105; G11B 27/3027; G11B 27/005; G11B 27/11; H04N 1/00307; H04N 5/765; H04N 5/232; H04N 5/77; H04N 5/783; H04N 5/91; H04N 9/8205; H04N 9/79;
(Continued)

(56) References Cited

U.S. PATENT DOCUMENTS

2006/0158558 A1  7/2006 Chung
2008/0089665 A1  4/2008 Thambiratnam et al.
(Continued)

FOREIGN PATENT DOCUMENTS

CN        101257787 A     9/2008
CN        101867657 A    10/2010
(Continued)

OTHER PUBLICATIONS

Office Action dated Jun. 2, 2017, in counterpart Chinese Application No. 201510622863.7 and English translation thereof.
(Continued)

*Primary Examiner* — Duc Nguyen
*Assistant Examiner* — Alexander L Eljaiek
(74) *Attorney, Agent, or Firm* — Finnegan, Henderson, Farabow, Garrett & Dunner LLP

(57) ABSTRACT

A control method for controlling audio playing includes obtaining a playing instruction corresponding to a multi-media file, detecting whether a current playing environment meets a preset condition, and controlling playing of audio data in the multi-media file if the current playing environment meets the preset condition. The current playing environment includes at least one of a current audio output channel, the multi-media file, and a current time.

18 Claims, 4 Drawing Sheets

(51) Int. Cl.
*G11B 27/10* (2006.01)
*G11B 27/28* (2006.01)

(58) Field of Classification Search
CPC ........... H04N 21/4131; H04N 21/4302; H04N 21/43615; H04N 21/4408; H04W 4/008
USPC ............................ 386/200, 230, 248; 700/94
See application file for complete search history.

(56) References Cited

U.S. PATENT DOCUMENTS

| | | | |
|---|---|---|---|
| 2009/0192636 A1* | 7/2009 | Miles .................. | G11B 27/105 700/94 |
| 2010/0027807 A1 | 2/2010 | Jeon | |
| 2010/0226499 A1 | 9/2010 | De Bruijn et al. | |
| 2013/0238341 A1 | 9/2013 | You | |
| 2014/0029782 A1 | 1/2014 | Rayner | |
| 2014/0178034 A1* | 6/2014 | Kim ....................... | H04N 5/765 386/230 |
| 2014/0248036 A1 | 9/2014 | Saari et al. | |
| 2015/0263692 A1 | 9/2015 | Bush | |

FOREIGN PATENT DOCUMENTS

| | | |
|---|---|---|
| CN | 103237277 A | 8/2013 |
| CN | 103531215 A | 1/2014 |
| CN | 103593127 A | 2/2014 |
| CN | 103761063 A | 4/2014 |
| CN | 104112459 A | 10/2014 |
| CN | 104183251 A | 12/2014 |
| CN | 104469219 A | 3/2015 |
| CN | 104934048 A | 9/2015 |
| GB | 2456835 A | 7/2009 |
| JP | 2001-111970 A | 4/2001 |
| JP | 2007-5853 A | 1/2007 |
| JP | 2013-9119 A | 1/2013 |
| RU | 2419477 C2 | 5/2011 |
| WO | WO 97/36391 | 10/1997 |
| WO | WO 2010/117213 A2 | 10/2010 |

OTHER PUBLICATIONS

Extended Search Report for European Application No. 16190700.1 from the European Patent Office, dated Feb. 6, 2017.
Written Opinion of the International Searching Authority in International Application No. PCT/CN2015/099681, dated Jun. 29, 2016.
English version of International Search Report of PCT Application No. PCT/CN2015/099681, dated Jun. 29, 2015, issued by the ISA/CN—State Intellectual Property Office of the P.R. China.

* cited by examiner

METHOD, APPARATUS, AND STORAGE MEDIUM FOR CONTROLLING AUDIO PLAYING BASED ON PLAYING ENVIRONMENT

CROSS REFERENCE TO RELATED APPLICATION

This application is based upon and claims priority to Chinese Patent Application No. 201510622863.7, filed with the State Intellectual Property Office of P. R. China on Sep. 25, 2015, the entire contents of which are incorporated herein by reference.

TECHNICAL FIELD

The present disclosure relates to multi-media technology and, more particularly, to a method, apparatus, and storage medium for controlling audio playing.

BACKGROUND

In the conventional technology, when an electronic device having audio playing function, such as a mobile phone, a tablet computer, a television, or a speaker, receives a playing instruction corresponding to an audio or video file, the electronic device can directly play audio data in the audio or video file using a default audio output channel. However, this may affect people nearby. For example, if a video file is played at midnight and the default audio output channel is a high-power speaker, other people, such as family members or neighbors, can be disturbed.

SUMMARY

In accordance with the present disclosure, there is provided a control method for controlling audio playing including obtaining a playing instruction corresponding to a multi-media file, detecting whether a current playing environment meets a preset condition, and controlling playing of audio data in the multi-media file if the current playing environment meets the preset condition. The current playing environment includes at least one of a current audio output channel, the multi-media file, and a current time.

Also in accordance with the present disclosure, there is provided a control device for playing an audio including a processor and a memory storing instructions. The instructions, when executed by the processor, cause the processor to obtain a playing instruction corresponding to a multi-media file, detect whether a current playing environment meets a preset condition, and control playing of audio data in the multi-media file if the current playing environment meets the preset condition. The current playing environment includes at least one of a current audio output channel, the multi-media file, and a current time.

Also in accordance with the present disclosure, there is provided a non-transitory computer-readable storage medium having stored therein instructions that, when executed by a processor of a device, cause the device to obtain a playing instruction corresponding to a multi-media file, detect whether a current playing environment meets a preset condition, and control playing of audio data in the multi-media file if the current playing environment meets the preset condition. The current playing environment includes at least one of a current audio output channel, the multi-media file, and a current time.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers represent the same or similar elements, unless otherwise represented. The implementations set forth in the following description of exemplary embodiments do not represent all implementations consistent with the present disclosure. Instead, they are merely examples of apparatuses and methods consistent with aspects related to the present invention as recited in the appended claims.

Figure 1:
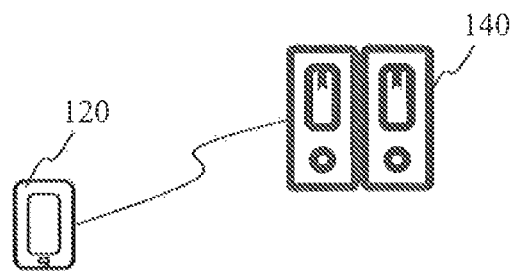
FIG. 1 is a schematic diagram illustrating an implementation environment according to an exemplary embodiment.

FIG. 1 is a schematic diagram illustrating an implementation environment according to an exemplary embodiment. The implementation environment includes a terminal 120 and a loudspeaker 140.

The terminal 120 can be an electronic device, such as a mobile phone, a tablet computer, an e-book reader, a multi-media player, a desktop computer, a laptop, a smart television, or the like. Usually, the terminal 120 has two audio output channels, with one for a speaker and the other one for an earphone.

The terminal 120 can be connected with the loudspeaker 140 via a wired or wireless connection. The wired connection can include, but is not limited to, a speaker wire, a wired network, or the like. The wireless connection can include, but is not limited to, an infrared connection, a Bluetooth connection, a Wireless Fidelity (Wi-Fi) connection, or the like.

The loudspeaker 140 can be a wired loudspeaker or a wireless loudspeaker, such as a Bluetooth loudspeaker, a Wi-Fi loudspeaker, or an infrared loudspeaker. Consistent with the present disclosure, the terminal 120 can be connected with one or more loudspeakers 140, and each loudspeaker 140 can be considered as one audio output channel.

Methods and device consistent with the present disclosure can be implemented, for example, in the terminal 120 in the implementation environment shown in FIG. 1.

Figure 2:
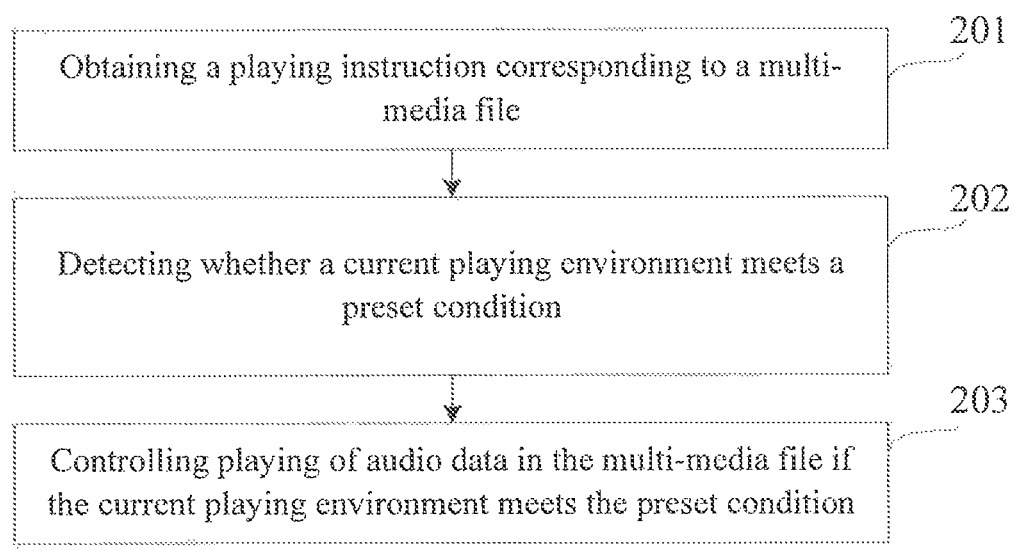
FIG. 2 is a flow chart showing a control method for controlling audio playing according to an exemplary embodiment.

FIG. 2 is a flow chart showing a control method for controlling audio playing according to an exemplary embodiment. As shown in FIG. 2, at 201, a playing instruction corresponding to a multi-media file is obtained. The multi-media file can be an audio file or a video file. At 202, it is detected whether a current playing environment meets a preset condition. The current playing environment includes at least one of a current audio output channel, the multi-media file, or a current time. At 203, if the current playing environment meets the preset condition, playing of audio data in the multi-media file is controlled.

The current playing environment can be represented by data, describing the audio output channel, the multi-media file, and/or the current time. Further, the controlling of the playing can include permitting playing or restricting playing as appropriate to the environment and the preset condition. The controlling of the playing can also include modifying the current playing, such as by prompting the user in connection with the playing, controlling the audio output volume to be lower than a preset value, or restricting the playing of particular multi-media files or on particular channels.

The multi-media file can be an audio file or a video file. The playing instruction is triggered by a user and is configured to instruct the terminal to play the multi-media file. When the terminal 120 receives the playing instruction, the terminal 120 does not play the multi-media file directly. Instead, the terminal 120 first detects whether the current playing environment meets the preset condition. The current playing environment includes at least one of a current audio output channel, the multi-media file, or a current time.

As described above, the terminal 120 can have one or more audio output channels. For example, audio output channels on the terminal 120 typically include a speaker and an earphone, and the terminal 120 can be connected with one or more loudspeakers 140 and each loudspeaker 140 can be considered one audio output channel. The current audio output channel refers to a default audio output channel used by the terminal 120 to play audio data in a current case. For example, the current audio output channel can be the speaker, the earphone, or the one or more loudspeakers 140.

If the current playing environment includes the current audio output channel, the terminal 120 detects whether the current audio output channel is one of at least one preset audio output channel. If the current audio output channel is one of the at least one preset audio output channel, the terminal 120 determines that the current playing environment meets the preset condition.

A preset audio output channel can be preset by the user or can be a default audio output channel. In some embodiments, an audio output channel with the loudspeaker function can be set as a preset audio output channel. For example, the speaker built in the terminal and/or the external loudspeaker can be set as a preset audio output channel. In some embodiments, an audio output channel with a power higher than a preset power or with a playing volume higher than a preset volume can be set as a preset audio output channel. For example, the external high-power Bluetooth loudspeaker can be set as a preset audio output channel.

In some embodiments, whether the current audio output channel is one of the at least one preset audio output channel can be detected by obtaining an identifier corresponding to the current audio output channel and detecting whether the identifier corresponding to the current audio output channel exists in a preset identifier set. If the identifier corresponding to the current audio output channel exists in the preset identifier set, it is determined that the current audio output channel is one of the at least one preset audio output channel.

The identifiers corresponding to the audio output channels are used to distinguish and identify different audio output channels. For example, the identifiers can be Media Access Control (MAC) addresses or device names of the audio output channels. As another example, the identifiers can be unique character strings generated according to a preset rule. The preset identifier set contains identifiers corresponding to various preset audio output channels. It is determined that the current audio output channel is one of the at least one preset audio output channel if the identifier corresponding to the current audio output channel exists in the preset identifier set. In contrast, it is determined that the current audio output channel is not one of the at least one preset audio output channel if the identifier corresponding to the current audio output channel does not exist in the preset identifier set.

In addition, the terminal 120 can provide a corresponding channel setting interface for the user to set the at least one preset audio output channel. For example, the terminal 120 displays the channel setting interface, which contains at least one audio output channel, obtains a selecting instruction corresponding to a target audio output channel, and adds an identifier corresponding to the target audio output channel into the preset identifier set.

Figure 3A:
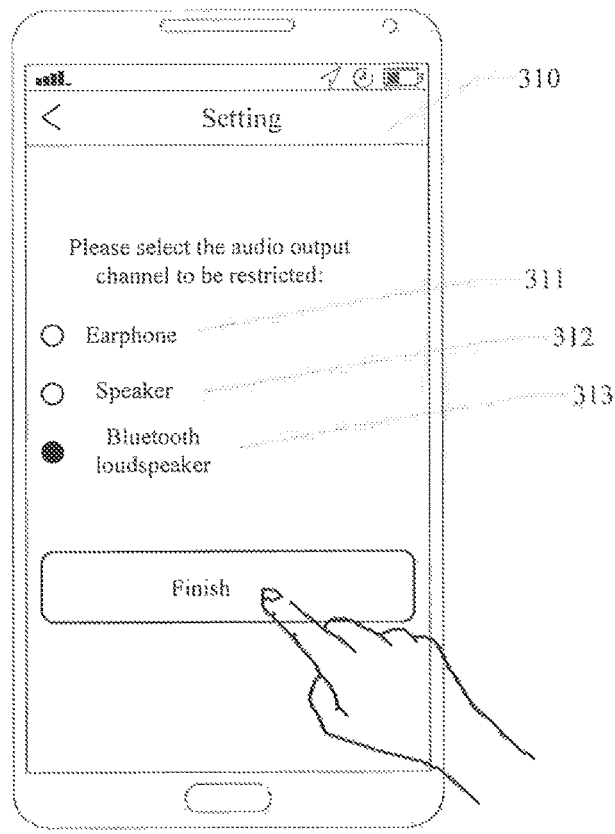
FIG. 3A is a schematic diagram illustrating a channel setting interface according to an exemplary embodiment.

FIG. 3A illustrates a schematic diagram of a channel setting interface 310 as an example. The channel setting interface 310 contains three audio output channels, i.e., an earphone 311, a speaker 312, and a Bluetooth loudspeaker 313. The user can select one or more audio output channels to control according to needs. For example, as shown in FIG. 3A, the user selects the Bluetooth loudspeaker 313. Correspondingly, the terminal 120 will add the identifier corresponding to the Bluetooth loudspeaker 313 into the preset identifier set.

If the current playing environment includes the multi-media file, the terminal 120 detects whether the multi-media file belongs to a target media-file type. If the multi-media file belongs to the target media-file type, the terminal 120 determines that the current playing environment meets the preset condition.

The target media-file type can be preset by the user or can be a default media-file type. For example, if the user wishes to control the play of relatively loud music, the user can set rock music as the target media-file type. As another example, if the user wishes to control the play of sensitive audios and videos, the user can set adult video as the target media-file type.

The terminal 120 can detect whether the multi-media file belongs to the target media-file type according to various approaches, as described below.

In one approach, the terminal 120 obtains a file name of the multi-media file, detects whether the file name contains a first preset keyword, and determines that the multi-media file belongs to the target media-file type if the file name contains the first preset keyword. The first preset keyword can be preset by the user or can be a default keyword. For example, to control the play of multimedia files of a rock music type, a rock artist's name, a rock song title, etc. can be set as the first preset keyword. As another example, to control the play of adult videos, a name of an adult video star, an adult video title, etc. can be set as the first preset keyword. In some embodiments, the terminal 120 can detect whether the file name contains the first preset keyword by using a keyword matching algorithm.

In another approach, the terminal 120 extracts at least one audio data sequence from the multi-media file, detects whether the at least one audio data sequence contains a second preset keyword by a speech recognition technology, and determines that the multi-media file belongs to the target media-file type if the at least one audio data sequence contains the second preset keyword. The second preset keyword can be preset by the user or can be a default keyword. The terminal 120 can convert the extracted audio data sequence into text content by the speech recognition technology, and then detects whether the text content contains the second preset keyword by using a keyword matching algorithm.

In another approach, the terminal 120 extracts at least one image frame from the multi-media file, detects whether the at least one image frame contains a target element by an image recognition technology, and determines that the multi-media file belongs to the target media-file type if the at least one image frame contains the target element. For example, to control the play of adult videos, the sensitive part can be set as the target element. In addition, the image recognition technology includes, but is not limited to, a color-based image recognition technology, a brightness-based image recognition technology, a contrast-based image recognition technology, or the like. To recognize an image, feature information, such as a color feature, a profile feature, and/or a texture feature, can be extracted from component elements of the image, and then the extracted features can be compared with features of the target element. Whether the target element exists in the image is determined according to the comparison result.

The above-described approaches are merely exemplary and explanatory. The terminal 120 can detect whether the multi-media file belongs to the target media-file type according to other attribute information of the multi-media file.

If the current playing environment includes the current time, the terminal 120 detects whether the current time is within a preset period of time. If the current time is within the preset period of time, the terminal 120 determines that the current playing environment meets the preset condition.

The preset period of time can be preset by the user or can be a default period of time. For example, to control playing audios at late night and in early morning hours, the preset period of time can be set to 10:00 pm to 6:00 am in order to avoid disturbing nearby people. If the current time is 10:30 pm, the terminal 120 determines that the current playing environment meets the preset condition.

As discussed above, the various preset conditions can be set by the user or can be default conditions. The user can set the conditions according to the user's actual needs and user experience can be improved. On the other hand, the terminal 120 can synchronize the preset conditions from a cloud server, thus reducing the user's operating requirements.

As described above, if the current playing environment meets the preset condition, playing of the audio data is controlled. In some embodiments, to control the playing of the audio data, the terminal 120 displays a prompt message for reminding the user to play the multi-media file with caution. When seeing the prompt message, the user can adjust the current playing environment accordingly.

Figure 3B:
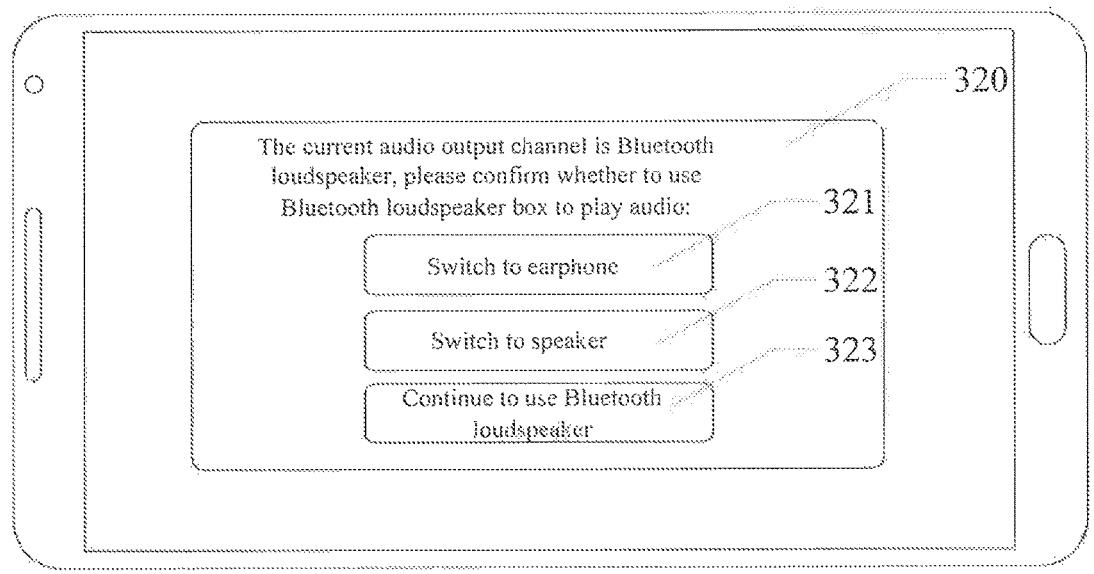
FIG. 3B is a schematic diagram illustrating a display interface for prompting a message according to an exemplary embodiment.

For example, the terminal 120 detects that the current audio output channel is one of the at least one preset audio output channel. As shown in FIG. 3B, the terminal 120 displays a prompt message 320 in a floating window. In the example shown in FIG. 3B, the current audio output channel is the Bluetooth loudspeaker. The prompt message 320 contains three different option controls, i.e., option control 321 ("Switch to earphone"), option control 322 ("Switch to speaker"), and option control 323 ("Continue to use Bluetooth loudspeaker"). The user can adjust the current audio output channel accordingly. For example, if the user clicks the option control 321, the terminal 120 switches the current audio output channel to the earphone. Then the terminal 120 can play the audio data in the multi-media file via the earphone.

In some embodiments, to control playing of the audio data in the multi-media file, the terminal 120 controls a playing volume of the audio data to be lower than a preset threshold. The preset threshold can be preset by the user or can be a default threshold. By controlling the playing volume of the audio data in to be lower than the preset threshold, the playing volume can be maintained in a relatively lower range. On the one hand, the normal playing of multi-media files will not be affected and the user can still enjoy the audios or videos in the multi-media files. On the other hand, the nearby people would not hear the associated audio content, and thus would not be disturbed.

On the other hand, if the current playing environment does not meet the preset condition, the terminal 120 plays the audio data in the multi-media file normally via the current audio output channel.

In some embodiments, the audio playing can be controlled through various other approaches, such as, for example, limiting the audio output channel, limiting the types of multi-media files, and limiting the playing period of time. Any of these approaches or a combination thereof can be used to control the audio playing.

Exemplary apparatuses consistent with the present disclosure are described below. Operations of the exemplary apparatuses are similar to the exemplary embodiments described above, and thus their detailed description is omitted here.

Figures 4, 5:
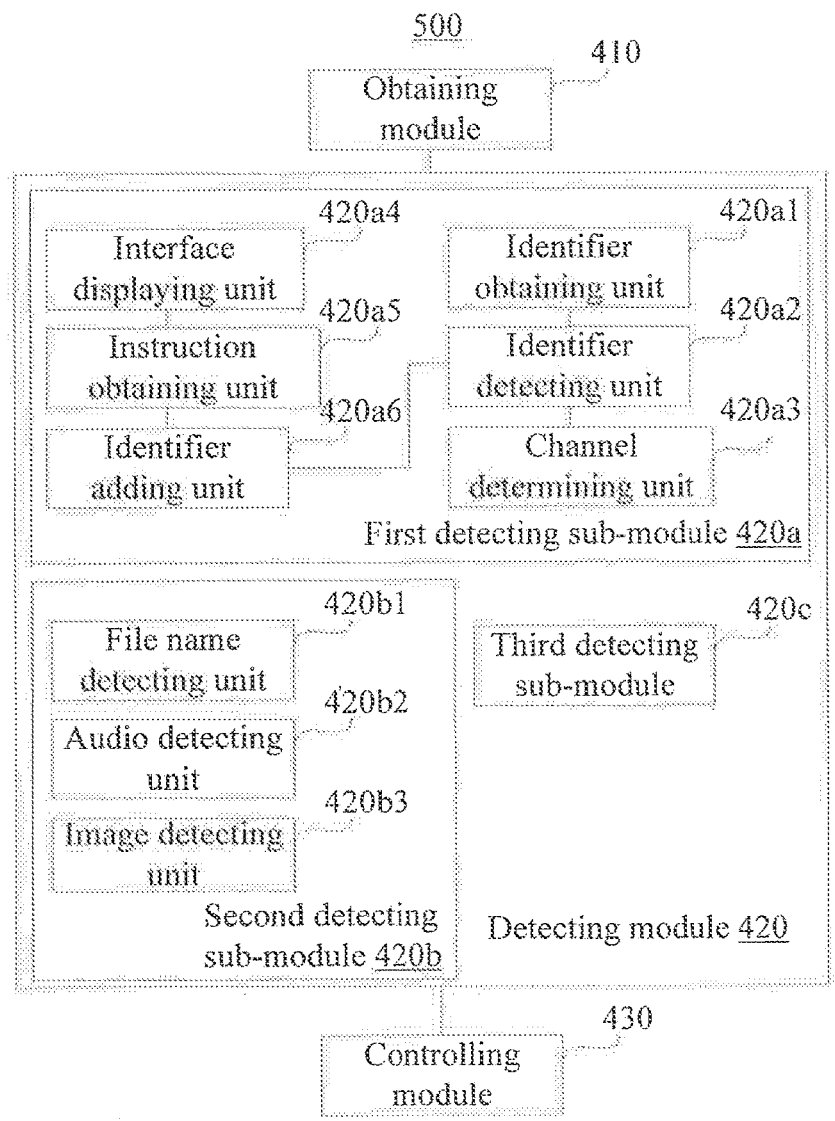
FIG. 4 is a block diagram showing a control apparatus for controlling audio playing according to an exemplary embodiment.
FIG. 5 is a block diagram showing a control apparatus for controlling audio playing according to another exemplary embodiment.

FIG. 4 is a block diagram showing a control apparatus 400 for controlling audio playing according to an exemplary embodiment. The control apparatus 400 includes an obtaining module 410, a detecting module 420, and a controlling module 430. The obtaining module 410 is configured to obtain a playing instruction corresponding to a multi-media file. The multi-media file is an audio file or a video file. The detecting module 420 is configured to detect whether a current playing environment meets a preset condition. The current playing environment includes at least one of a current audio output channel, the multi-media file, and a current time. The controlling module 430 is configured to control playing of audio data in the multi-media file if the current playing environment meets the preset condition.

FIG. 5 is a block diagram showing a control apparatus 500 for controlling audio playing according to another exemplary embodiment. The control apparatus 500 includes the obtaining module 410, the detecting module 420, and the controlling module 430.

As shown in FIG. 5, the detecting module 420 includes at least one of a first detecting sub-module 420a, a second detecting sub-module 420b, and a third detecting sub-module 420c. The first detecting sub-module 420a is configured to detect whether the current audio output channel is one of at least one preset audio output channel if the current playing environment includes the current audio output channel, and determine that the current playing environment meets the preset condition if the current audio output channel is one of the at least one preset audio output channel. The second detecting sub-module 420b is configured to detect whether the multi-media file belongs to a target media-file type if that the current playing environment includes the multi-media file, and determine that the current playing environment meets the preset condition if the multi-media file belongs to the target media-file type. The third detecting sub-module 420c is configured to detect whether the current time is within a preset period of time if the current playing environment includes the current time, and determine that the current playing environment meets the preset condition if the current time is within the preset period of time.

The first detecting sub-module 420a includes an identifier obtaining unit 420a1, an identifier detecting unit 420a2, a channel determining unit 420a3, an interface displaying unit 420a4, an instruction obtaining unit 420a5, and an identifier adding unit 420a6. The identifier obtaining unit 420a1 is configured to obtain an identifier corresponding to the current audio output channel. The identifier detecting unit 420a2 is configured to detect whether the identifier corresponding to the current audio output channel exists in a preset identifier set. The channel determining unit 420a3 is configured to determine that the current audio output channel is one of the at least one preset audio output channel if the identifier corresponding to the current audio output channel exists in the preset identifier set. The interface displaying unit 420a4 is configured to display a channel setting interface, which contains at least one audio output channel. The instruction obtaining unit 420a5 is configured to obtain a selecting instruction corresponding to a target audio output channel. The identifier adding unit 420a6 is configured to add an identifier corresponding to the target audio output channel into the preset identifier set.

The second detecting sub-module 420b includes at least one of a file name detecting unit 420b1, an audio detecting unit 420b2, and an image detecting unit 420b3. The file name detecting unit 420b1 is configured to obtain a file name of the multi-media file, detect whether the file name includes a first preset keyword, and determine that the multi-media file belongs to the target media-file type if the file name includes the first preset keyword. The audio detecting unit 420b2 is configured to extract at least one audio data sequence from the multi-media file, detect whether the at least one audio data sequence includes a second preset keyword by using a speech recognition technology, and determine that the multi-media file belongs to the target media-file type if the at least one audio data sequence includes the second preset keyword. The image detecting unit 420b3 is configured to extract at least one image frame from the multi-media file, detect whether the at least one image frame includes a target element, and determine that the multi-media file belongs to the target media-file type if the at least one image frame includes the target element.

In some embodiments, the controlling module 430 is configured to display a prompt message for reminding a user to play the multi-media file with caution. In some embodiments, the controlling module 430 is configured to control a playing volume of the audio data in the multi-media file to be lower than a preset threshold.

The exemplary apparatuses described above are illustrated with functional modules. In practical applications, the above-mentioned functions can be realized by different function modules according to practical needs, i.e., the content structure of an apparatus can be divided into different functional modules to realize all or part of the functions described above.

According to the present disclosure, there is provided a control device for controlling audio playing. The device includes a processor and a memory storing instructions executable by the processor. The processor is configured to perform a method consistent with the present disclosure, such as one of the above-described exemplary method.

Figure 6:
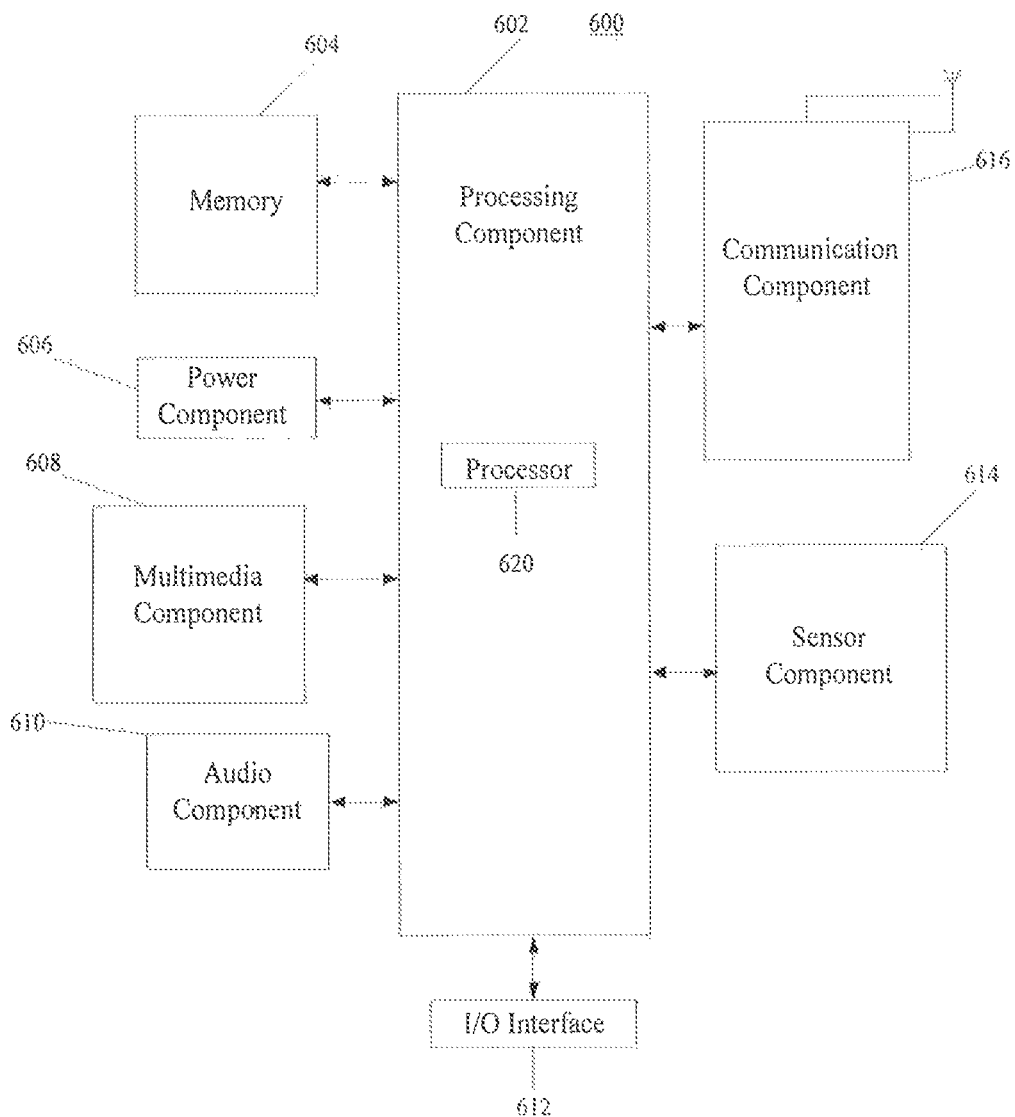
FIG. 6 is a block diagram showing a device according to an exemplary embodiment.

FIG. 6 is a block diagram showing a control device 600 for controlling audio playing according to an exemplary embodiment. For example, the device 600 may be a mobile phone, a computer, a digital broadcast terminal, a messaging device, a gaming console, a tablet, a medical device, exercise equipment, a personal digital assistant, or the like.

Referring to FIG. 6, the device 600 includes one or more of the following components: a processing component 602, a memory 604, a power component 606, a multimedia component 608, an audio component 610, an input/output (I/O) interface 612, a sensor component 614 and a communication component 616.

The processing component 602 typically controls overall operations of the device 600, such as the operations associated with display, telephone calls, data communications, camera operations, and recording operations. The processing component 602 may include one or more processors 620 to execute instructions so as to perform all or a part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, videos, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 is configured to provide power to various components of the device 600. The power component 606 may include a power management system, one or more power sources, and other components associated with the generation, control, and distribution of power in the device 600.

The multimedia component 608 includes a screen configured to provide an output interface between the device 600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum when the device 600 is in an operation mode such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a loud speaker to output audio signals.

The I/O interface 612 is configured to provide an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an on/off status of the device 600, relative positioning of components (e.g., a display screen and a keypad) of the device 600. The sensor component 614 may further detect a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may further include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate a wired or wireless communication between the device 600 and other terminals. The device 600 can access a wireless network based on a communication standard, such as WiFi, 2G, 3G, or 4G, or a combination thereof. In one exemplary embodiment, the communication component 616 receives a broadcast signal or broadcast associated information from an external broadcast control system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, or another technology.

In exemplary embodiments, the device 600 may be implemented with one or more electronic elements such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above-described exemplary methods.

In exemplary embodiments, there is further provided a non-transitory computer-readable storage medium including instructions, such as the memory 604 including instructions executable by the processor 620 in the device 600 to perform a method consistent with the present disclosure, such as one of the above-described exemplary methods. For example the non-transitory computer-readable storage medium may be a ROM, a RAM, a CD-ROM, a magnetic tape, a floppy disc, an optical data storage device, or the like.

According to the present disclosure, the playing of audio data is properly controlled according to the actual situation to avoid disturbing people nearby. Specifically, the audio data is played when a current playing environment meets a preset condition. Therefore, the playing of the audio data can be more intelligent.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present invention only be limited by the appended claims.

What is claimed is:

1. A control method for controlling audio playback, comprising:
    obtaining, by an electronic device, a play instruction corresponding to a multi-media file;
    detecting, by the electronic device, whether a current playing environment meets a preset condition, the current playing environment including a current time and at least one of a current audio output channel and content of the multi-media file, wherein the content of the multi-media file includes sensitive information; and
    controlling, by the electronic device, playback of audio data in the multi-media file if the current playing environment meets the preset condition,
    wherein detecting whether the current playing environment meets the preset condition includes:
        when the current playing environment includes the content of the multi-media file, detecting whether the content of the multi-media file belongs to a target media-file content genre; and
        determining that the current playing environment meets the preset condition if the content of the multi-media file belongs to the target media-file content genre, and
    wherein detecting whether the content of the multi-media file belongs to the target media-file content genre includes:
        extracting at least one image frame from the multi-media file;
        detecting whether the at least one image frame includes a target element; and
        determining that the content of the multi-media file belongs to the target media-file content genre if the at least one image frame includes the target element.

2. The method according to claim 1, wherein detecting whether the current playing environment meets the preset condition includes:
    detecting whether the current time is within a preset period of time;
    determining that the current playing environment meets the preset condition if the current time is within the preset period of time;

when the current playing environment includes the current audio output channel, detecting whether the current audio output channel is a preset audio output channel if the current playing environment includes the current audio output channel; and determining that the current playing environment meets the preset condition if the current audio output channel is the preset audio output channel.

3. The method according to claim 2, wherein detecting whether the current audio output channel is the preset audio output channel includes:

obtaining an identifier corresponding to the current audio output channel;

detecting whether the identifier exists in a preset identifier set; and determining that the current audio output channel is the preset audio output channel if the identifier exists in the preset identifier set.

4. The method according to claim 3, further comprising:

displaying a channel setting interface, the channel setting interface including at least one candidate audio output channel;

obtaining a selecting instruction corresponding to one of the at least one candidate audio output channel; and adding an identifier corresponding to the one of the at least one candidate audio output channel into the preset identifier set.

5. The method according to claim 2, wherein detecting whether the content of the multi-media file belongs to the target media-file content genre includes:

obtaining a file name of the multi-media file, detecting whether the file name includes a first preset keyword, and determining that the content of the multi-media file belongs to the target media-file content genre if the file name includes the first preset keyword; or extracting at least one audio data sequence from the multi-media file, detecting whether the at least one audio data sequence includes a second preset keyword, and determining that the content of the multi-media file belongs to the target media-file content genre if the at least one audio data sequence includes the second preset keyword.

6. The method according to claim 1, wherein controlling playback of the audio data includes:

displaying a prompt message for reminding a user to play the multi-media file with caution; or controlling a playback volume of the audio data to be lower than a preset threshold.

7. A control device for playing audio, comprising:

a processor; and a memory storing instructions that, when executed by the processor, cause the processor to:

obtain a play instruction corresponding to a multimedia file;

detect whether a current playing environment meets a preset condition, the current playing environment including a current time and at least one of a current audio output channel and content of the multi-media file, wherein the content of the multi-media file includes sensitive information; and control playback of audio data in the multi-media file if the current playing environment meets the preset condition, wherein when detecting whether the current playing environment meets the preset condition, the instructions further cause the processor to:

when the current playing environment includes the content of the multi-media file, detect whether the content of the multi-media file belongs to a target media-file content genre; and determine that the current playing environment meets the preset condition if the content of the multi-media file belongs to the target media-file content genre, and wherein when detecting whether the content of the multi-media file belongs to the target media-file content genre, the instructions further cause the processor to:

extract at least one image frame from the multi-media file;

detect whether the at least one image frame includes a target element; and determine that the content of the multi-media file belongs to the target media-file content genre if the at least one image frame includes the target element.

8. The device according to claim 7, wherein the instructions further cause the processor to:

detect whether the current time is within a preset period of time;

determine that the current playing environment meets the preset condition if the current time is within the preset period of time; and when the current playing environment includes the current audio output channel, detect whether the current audio output channel is a preset audio output channel; and determine that the current playing environment meets the preset condition if the current audio output channel is the preset audio output channel.

9. The device according to claim 8, wherein the instructions further cause the processor to:

obtain an identifier corresponding to the current audio output channel;

detect whether the identifier exists in a preset identifier set; and determine that the current audio output channel is the preset audio output channel if the identifier exists in the preset identifier set.

10. The device according to claim 9, wherein the instructions further cause the processor to:

display a channel setting interface, the channel setting interface including at least one candidate audio output channel;

obtain a selecting instruction corresponding to one of the at least one candidate audio output channel; and add an identifier corresponding to the one of the at least one candidate audio output channel into the preset identifier set.

11. The device according to claim 8, wherein the instructions further cause the processor to:

obtain a file name of the multi-media file, detect whether the file name includes a first preset keyword, and determine that the content of the multimedia file belongs to the target media-file content genre if the file name includes the first preset keyword; or extract at least one audio data sequence from the multi-media file, detect whether the at least one audio data sequence includes a second preset keyword, and determine that the content of the multi-media file belongs to the target media-file content genre if the at least one audio data sequence includes the second preset keyword.

12. The device according to claim 7, wherein the instructions further cause the processor to:

display a prompt message for reminding a user to play the multi-media file with caution; or control a playback volume of the audio data to be lower than a preset threshold.

13. A non-transitory computer-readable storage medium having stored therein instructions that, when executed by a processor of a device, cause the device to:

obtain a play instruction corresponding to a multi-media file;

detect whether a current playing environment meets a preset condition, the current playing environment including a current time and at least one of a current audio output channel and content of the multi-media file, wherein the content of the multi-media file includes sensitive information; and control playback of audio data in the multi-media file if the current playing environment meets the preset condition, wherein when detecting whether the current playing environment meets the preset condition, the instructions further cause the processor to:

when the current playing environment includes the content of the multi-media file, detect whether the content of the multi-media file belongs to a target media-file content genre; and determine that the current playing environment meets the preset condition if the content of the multi-media file belongs to the target media-file content genre, and wherein when detecting whether the content of the multi-media file belongs to the target media-file content genre, the instructions further cause the processor to:

extract at least one image frame from the multi-media file;

detect whether the at least one image frame includes a target element; and determine that the content of the multi-media file belongs to the target media-file content genre if the at least one image frame includes the target element.

14. The non-transitory computer-readable storage medium according to claim 13, wherein the instructions further cause the device to:

detect whether the current time is within a preset period of time;

determine that the current playing environment meets the preset condition if the current time is within the preset period of time; and when the current playing environment includes the current audio output channel, detect whether the current audio output channel is a preset audio output channel; and determine that the current playing environment meets the preset condition if the current audio output channel is the preset audio output channel.

15. The non-transitory computer-readable storage medium according to claim 14, wherein the instructions further cause the device to:

obtain an identifier corresponding to the current audio output channel;

detect whether the identifier exists in a preset identifier set; and determine that the current audio output channel is the preset audio output channel if the identifier exists in the preset identifier set.

16. The non-transitory computer-readable storage medium according to claim 15, wherein the instructions further cause the device to:

display a channel setting interface, the channel setting interface including at least one candidate audio output channel;

obtain a selecting instruction corresponding to one of the at least one candidate audio output channel; and add an identifier corresponding to the one of the at least one candidate audio output channel into the preset identifier set.

17. The non-transitory computer-readable storage medium according to claim 14, wherein the instructions further cause the device to:

obtain a file name of the multi-media file, detect whether the file name includes a first preset keyword, and determine that the content of the multi-media file belongs to the target media-file content genre if the file name includes the first preset keyword; or extract at least one audio data sequence from the multi-media file, detect whether the at least one audio data sequence includes a second preset keyword, and determine that the content of the multi-media file belongs to the target media-file content genre if the at least one audio data sequence includes the second preset keyword.

18. The non-transitory computer-readable storage medium according to claim 13, wherein the instructions further cause the device to:

display a prompt message for reminding a user to play the multi-media file with caution; or control a playback volume of the audio data to be lower than a preset threshold.

* * * * *